United States Patent [19]

Tabibzadeh

[11] Patent Number: 5,171,432
[45] Date of Patent: Dec. 15, 1992

[54] LIQUID AND PARTICLE SEPARATOR

[76] Inventor: Manouchehr Tabibzadeh, 17833 Miranda St., Encino, Calif. 91316

[21] Appl. No.: 599,635

[22] Filed: Mar. 5, 1991

[51] Int. Cl.⁵ ............................................. B01D 29/64
[52] U.S. Cl. ..................................... 210/94; 210/256; 210/298; 210/299; 210/416.1
[58] Field of Search ............... 210/256, 258, 298, 302, 210/311, 413, 415, 416.1, 257.1, 299, 94, 209

[56] References Cited

U.S. PATENT DOCUMENTS

| | | | |
|---|---|---|---|
| 36,530 | 9/1862 | Richardson | 210/416.1 |
| 569,159 | 10/1896 | Bain | 210/258 |
| 577,448 | 2/1897 | Petersen | 210/416.1 |
| 1,049,547 | 1/1913 | Strauss et al. | 210/311 |
| 1,065,992 | 7/1913 | Wheelock | 210/311 |
| 1,716,632 | 6/1929 | Gray et al. | 210/302 |
| 1,784,132 | 12/1930 | Cabrera | 210/311 |
| 3,029,950 | 4/1962 | Frasca | 210/256 |
| 4,692,246 | 9/1987 | Simon | 210/311 |

FOREIGN PATENT DOCUMENTS 546362  2/1977  U.S.S.R. .

Primary Examiner—Stanley S. Silverman
Assistant Examiner—Christopher Upton

[57] ABSTRACT

A fluid separator apparatus using a cylinder in which a piston is fitted and a conic tank is placed on top of the cylinder. The apparatus functions on the basis of the different densities of the liquids. The lighter liquid placed on top of a heavier liquid will enter into the conic tank first by the upward movement of the piston. As the piston moves upward, the lighter liquid enters into an exit pipe at the top of the conical tank and passes into a container outside of the apparatus. The fluid separator also contains a solid particle stainer and sweeping means to continually clean said stainer. Coloring means are included to permit visual inspection of the separation of the liquids at the various parts of the apparatus.

6 Claims, 5 Drawing Sheets

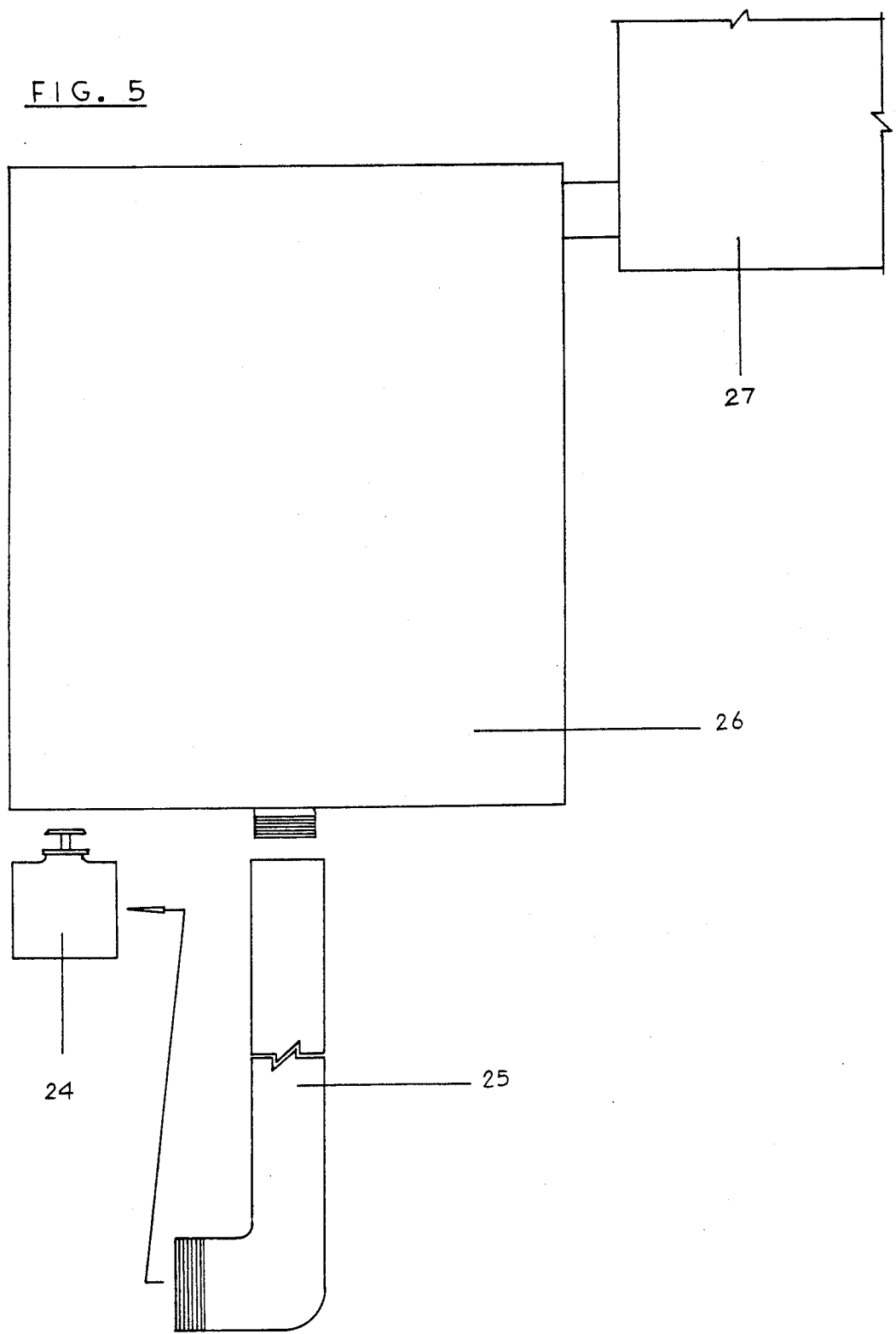

LIQUID AND PARTICLE SEPARATOR

BACKGROUND OF THE INVENTION

The present invention relates primarily to devices for separating liquids of different densities and also for removing particulates from these liquids.

In the past such liquid separators used filters, chemical solvents, other substances, and high pressure air or other gasses to separate liquids in any given fluid. These methods were expensive, time consuming and often not fully effective. The use of filters provided adequate separation, but was very slow because the filters imposed barriers to the flow of water. Chemical solvents or substances were expensive because of their cost and added to the contamination of the fluids.

SUMMARY OF THE INVENTION

The main object of the present invention is to separate a heavy liquid from a lighter liquid without using filters, chemicals, solvents or any other filtrate materials. This is done without changing the taste, color or composition of the various liquids to be separated while providing high flow rates of the fluid to be separated.

Other objects of the present invention are to provide apparatus to separate sewage, remove oil from water and provide a fluid separator which is inexpensive to manufacture, easy to use, functions quickly, is convenient to maintain, and has usefulness for many varied purposes.

These objects are partially achieved in the present invention by use of a piston to move fluid through a fluid separator which separates the various liquids in the combined fluid by taking advantage of their different densities. The lighter liquid rests above the heavier liquid and is moved by the force of the piston from a conical tank into an exit pipe provided on the narrow end of the conical tank.

The present invention has a cylinder in which a piston moves upward and/or downward by means of levers under the piston. A conical shaped tank is firmly attached at its widest part to the topmost edge of the cylinder. The lever means have a handle and by turning the handle, gears, shafts and levers communicate to move the piston upward. By turning the handle in the reverse direction, the piston moves downward.

The fluid to be separated is manually poured into the cylinder of the apparatus, then the conical tank is attached to the top of the cylinder. A perforated bowl is attached to the inside wall of the conical tank to prevent unwanted particles from moving to the top of the tank. A vertical rod passes through the center of the lower end of the piston. The lower end of this rod has a conical gear which is placed between and engages two other gears. At the top end of the rod, a sweeper arm or arms are installed.

After the fluid is poured into the cylinder and the conical tank attached to the cylinder, the handle attached to the lower gears is turned causing levers to communicate upward movement to the piston. The piston comes up gradually and continuously to carry the fluid into the conical tank. Naturally, the lighter liquid which is on top, will gather at the top end of the conical tank. By the movement and pressure of the piston upward, the lighter liquid enters into a pipe and discharges through a U-shaped pipe to an outside container.

When the handle which causes the piston to rise is rotated, it also moves the sweeper arm or arms around the perforated bowl to remove any additional non-fluid substances which adhere to the perforated bowl from fluid in the cylinder. This is necessary so that these particles do not block the flow of liquid through the perforated bowl.

A visual control is needed to ensure that all of the lighter liquid is discharged and the piston is stopped before forcing heavier liquid into the top of the conical tank and to discharge with the lighter liquid. For this purpose a portion of the outlet pipes are preferably transparent. The heavy liquid will return into the cylinder by the reverse turning of the handle thus moving the piston downward. The separated heavy liquid is manually poured out into a container after the conical tank and cylinder are detached, but automatic means to drain this heavy liquid without opening the tanks is also contemplated.

One embodiment of this invention used for the flow of larger amounts of fluid in industry comprises external tanks, joined to the separator through pipes and valves. Liquid passes automatically from the tanks into the separator cylinder. A funnel can be provided before the inlet to the separator to add liquid dye to the fluid. This dye can be selected to color either the lighter or heavier liquid to permit more visual control of the lighter fluid in order to stop operation of the piston at the correct time. For example, if water is dyed in red or green in a mixture of water and oil, the colored water is seen more easily and precisely as it exits the separator.

BRIEF DESCRIPTION OF THE DRAWINGS

FIGS. 4 & 5 are side views of the adaption of the present invention to large movements of fluid.

DESCRIPTION OF THE PREFERRED EMBODIMENTS

Figure 1:
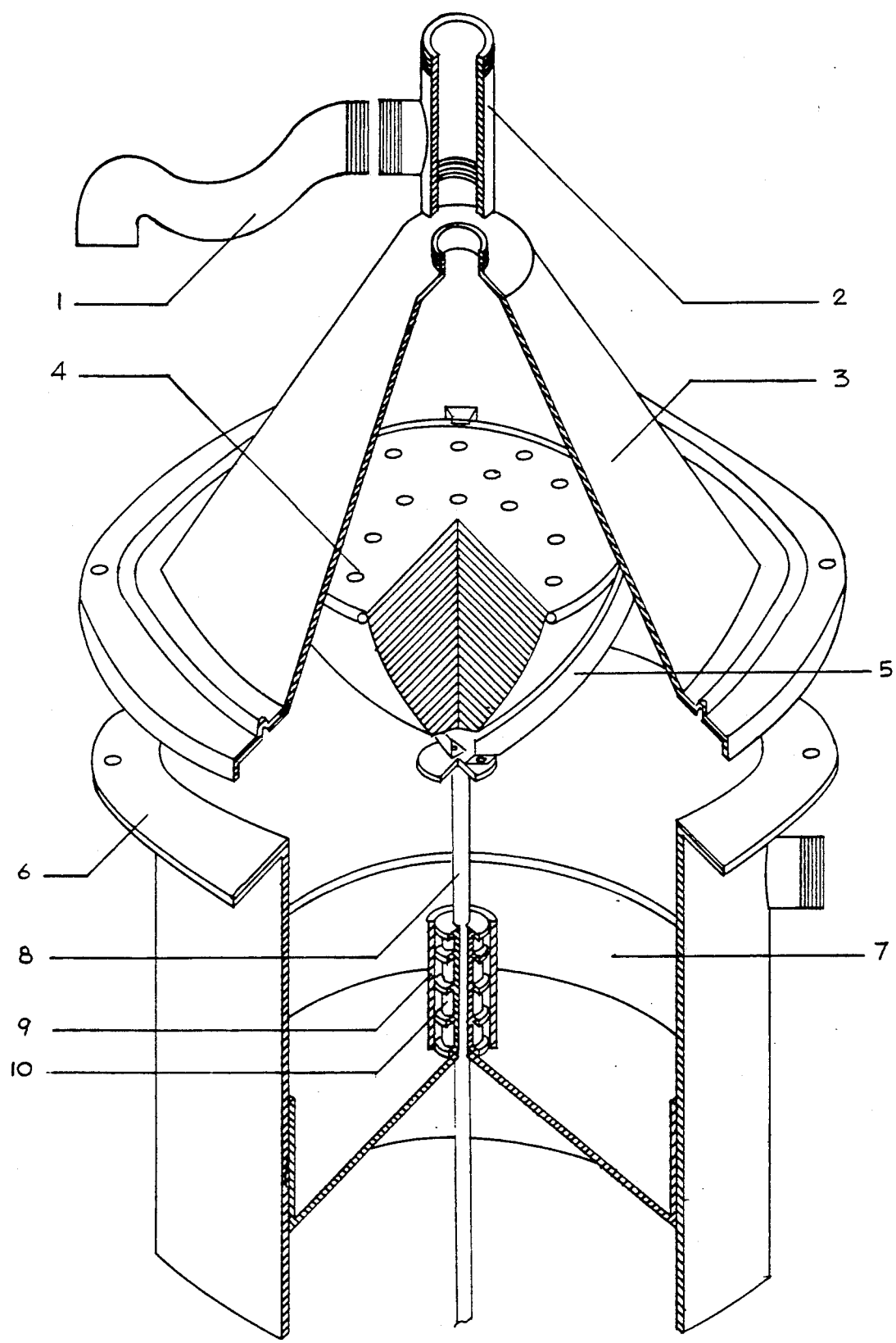
FIG. 1 is a side pictorial elevation and cross-sectional view of the present invention.

Referring to the figures, more particularly to the embodiment illustrated in FIG. 1, the present invention consists of cylinder 6 in which piston 7 is tightly fitted. Conical tank 3 is placed with some form of 0 ring seal on the top side of cylinder 6. Pipe 2 is threaded vertically into the top of the conical tank 3. A partially transparent U-shaped pipe is threaded horizontally onto the pipe 2. In use, liquid is poured into cylinder 6 wherein the lighter liquid naturally sits above the heavy liquid. This lighter fluid is carried up to the conical tank 3 by moving the piston upward. Such movement is continued gradually and the lighter fluid is moved upward to the topmost end of the conical tank 3. This lighter liquid then enters into pipe 2. As the piston 7 continues its movement upward, the lighter liquid is discharged through pipe 2 by the heavy liquid underneath and piston pressure pushing upward. The separated lighter liquid passes through partially transparent pipe 1 into a container outside of the apparatus. Transparent pipe 1 permits visual inspection of the lighter liquid as it moves through it.

FIG. 1 also illustrates the interior construction of the conical tank 3. Vertical rod 8 passes through the center of the piston 7, through fluid seals 9 and 10. A perforated bowl 4 without a top is firmly attached to the inside wall of the conical tank 3. Fan 5 is attached to the top end of the rod 8. Fan 5 is made of one or more pieces shaped to fit against the outer surface of the perforated bowl 4. By turning the rod 8, fan 5 sweeps the outside of perforated bowl 4 to remove any non-fluid substances accumulating on the outside surface of bowl 4 which may eventually interfere with the even flow of liquid towards the top end of the conical tank 3.

Figure 2:
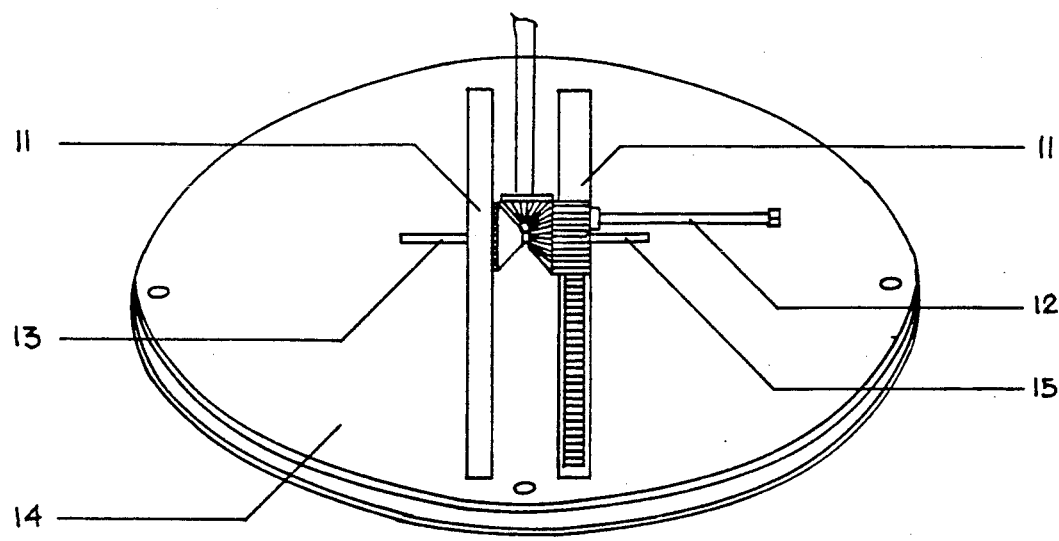
FIG. 2 is a pictorial view of the gear mechanism which moves the piston upward and also turns the sweeper rod in the present invention.
Figure 3:
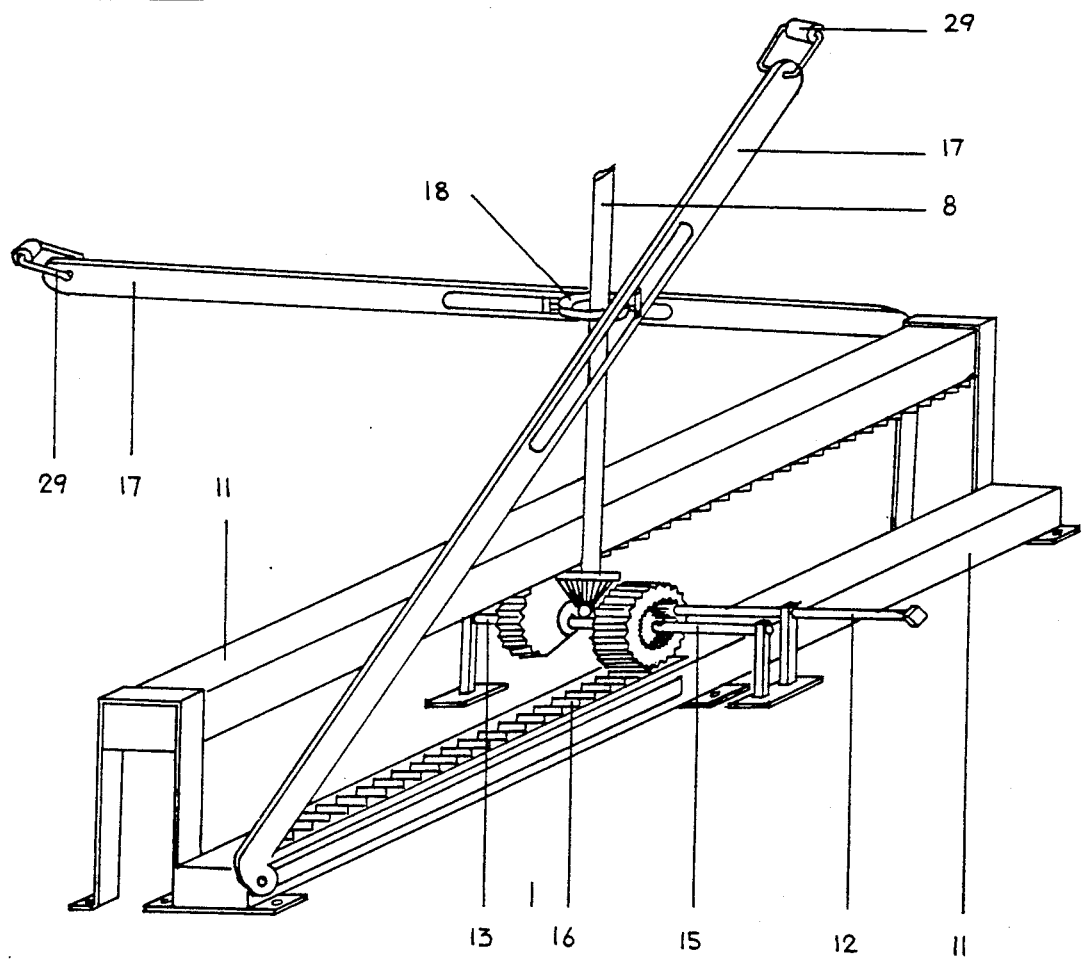
FIG. 3 is an expanded pictorial view of the mechanical apparatus which moves the piston upward and also turns the sweeper shaft in the present invention.

FIGS. 2 and 3 illustrate the mechanical means used in moving the piston 7 and rotating the sweeper 5. Two gears 13 are attached to a single rod 15. Handle 12 is attached to a gear which engages a gear on the inside of one of the gears 13. Lower toothed element 16 engages one gear 13 and upper toothed element 16 engages the other gear 13. The toothed elements 16 are fitted into boxes 11 for only horizontal movement. Two lever arms 17, left and right, are each hinged at their bottom ends to the end of each toothed element 16. Rollers 29, right and left, are attached to the top end of each lever 17. These rollers 29 engage the bottom of piston 7 to move it upward. A ring 18 is provided which is movably connected to each side of the levers 17. Vertical rod 8 passes loosely through ring 18. Such position allows levers 17 to move freely and the vertical rod 8 to turn.

The apparatus starts operation by turning handle 12. This causes gears 13 to turn and toothed elements 16 move one to the right and the other to the left. As a result, both the lower and top ends of the levers 17 move towards the center and move rollers 29 higher in a vertical direction. The rollers 29 on the top end of the levers 17 move under the piston 7 and at the same time push piston 7 upward. Consequently, the fluid in cylinder 6 is moved up to start operation. By turning the handle 12, rod 8 also rotates causing fan 5 to turn around the outside of perforated bowl 4 to remove any non-fluid substances which may hinder the flow of fluid from passing up towards the top end of the conical tank 3.

Figure 4:
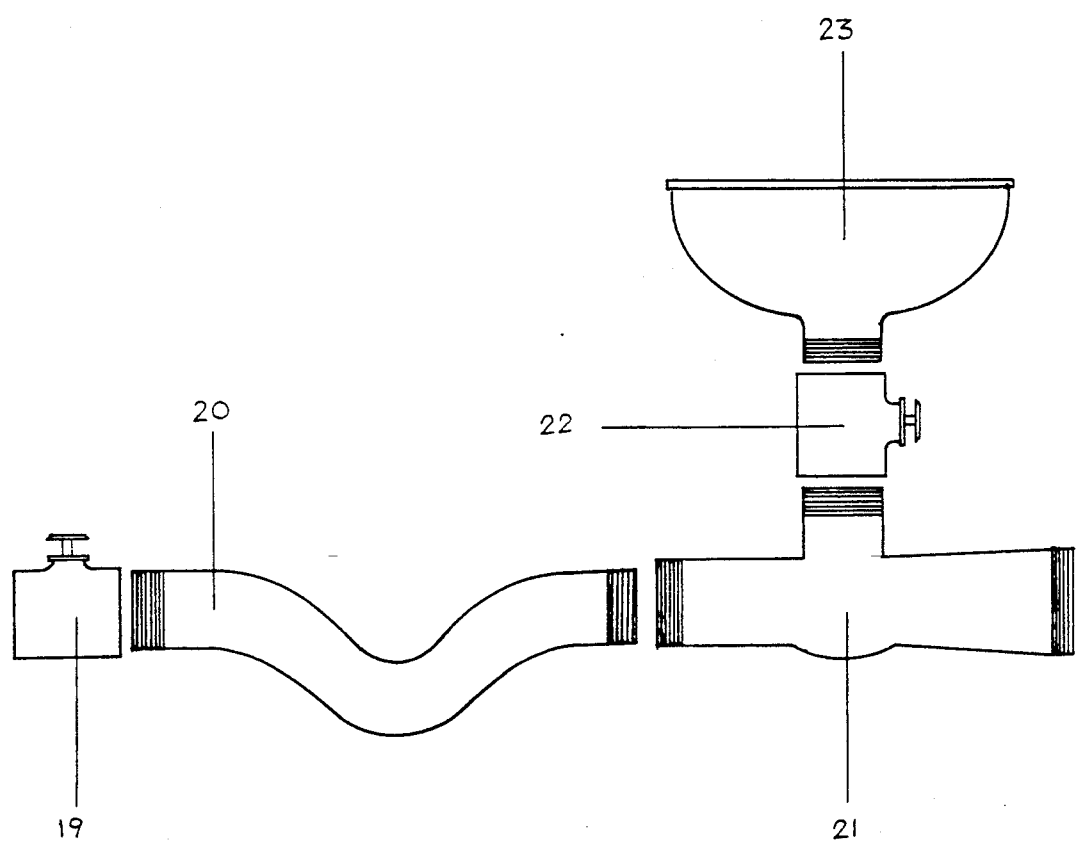

FIGS. 4 and 5 illustrate configurations to use the separator for large quantities of fluids in industrial applications. FIG. 5 shows two large storage tanks, one upper storage tank 27 and one lower storage tank 26, joined together. Pipe 25 is attached to the bottom of tank 26 and valve 24 is fastened to either end of pipe 25.

FIG. 4 illustrates a T-shaped pipe 21 horizontally attached to valve 24 at one end and to a U-shaped pipe 20 at the other end. Valve 22 is attached to the upper elevation of the T-shaped pipe 21 along with funnel 23. The left end of the U-shaped pipe 20 is attached to valve 19. This valve is attached to the pipe which enters cylinder 6. It is understood that the fluid in tank 27 enters by gravity into tank 26 and finally to cylinder 6, after passing through the valves and pipes shown in FIGS. 4 and 5.

Valve 24 is used to control the fluid quantity and pressure entering the separator. Funnel 23 and valve 22 are used to add colored substances into the fluid to be separated with no chemical effects. The colored fluid is used to color either the lighter or heavier fluid for a better visual examination of the separation. Valve 22 controls the introduction of the colored substances. Pipe 20 is of a partially or wholly transparent material for a better viewing of the colored liquid. Valve 19 prevents any further fluid from entering the cylinder 6 after cylinder 6 has been properly filled. A suitable drain hose and valve can be fitted into cylinder 6 to empty the heavier liquid to expedite setting up the separator for the next operation.

It is understood that for different quantities of fluid and for industrial purposes, the apparatus may be manufactured suitable to the size, measure and capacity of the use. It is also understood that the means to move the piston 7 and/or rotate the rod 8 can be electrical, mechanical or any other means.

I claim:

1. A liquid and particle separator apparatus comprising:

a vertically oriented cylinder open at both ends;

a removable conical shaped tank connected to the upper opening of the cylinder, said tank having a larger diameter lower opening converging to an upper smaller diameter discharge opening;

a movable piston within said cylinder, the outside walls of the piston engaging the inside walls of said cylinder;

a rod passing through said piston sealed to said piston with sealing means for preventing fluid from leaking out of the piston chamber around said rod while permitting rotation of said rod;

a solid particle filtering element means fastening inside said conical shaped tank;

a sweeping element means to sweep the solid particles off said solid particle filtering element, said sweeping element being securely fastened to the top of said rod;

vertical movement means to move said piston vertically;

rotating means to rotate said rod and sweeping element; and a discharge pipe connected to the top of said conical shaped tank to remove liquid forced upward by said piston.

2. The apparatus of claim 1, wherein:

said solid particle filtering element is shaped in the form of a perforated bowl and is securely fastened to said conical tank to permit fluid to pass through said solid particle filtering element, but not solid particles; and said sweeping element is shaped to sweep across the external surface of said bowl shaped filtering element.

3. The apparatus of claim 1 wherein the said vertical movement means to move the piston vertically and said rotating means to rotate said row are interconnected to simultaneously activate said vertical movement means and said rotating means.

4. The apparatus of claim 1 wherein:

said vertical movement means to move said piston vertically and said rotating means to rotate said rod comprise mechanical gear means; and said means to move said piston in a vertical direction comprises rollers engaging the bottom of said piston.

5. The apparatus of claim 1 wherein:

an inlet pipe means is connected to said cylinder to permit the introduction of a fluid into the inside of said cylinder.

6. The apparatus of claim 5 wherein:

said inlet pipe is connected to external means to permit the introduction of coloring material to said fluid; and said discharge pipe has a portion which is transparent in order to observe said colored liquid.

* * * * *